United States Patent Office 3,214,248
Patented Oct. 26, 1965

3,214,248
EXTRACTING SILVER SALTS FROM AQUEOUS SOLUTION BY ORGANIC SOLVENTS
Ulrich Schwenk and Günter Mau, Frankfurt am Main, and Ludwig Schläfer, Sulzbach, Taunus, Germany, assignors to Farbwerke Hoechst Aktiengesellschaft vormals Meister Lucius & Brüning, Frankfurt am Main, Germany, a corporation of Germany
No Drawing. Filed Aug. 7, 1961, Ser. No. 129,571
Claims priority, application Germany, Aug. 12, 1960, F 31,867
9 Claims. (Cl. 23—312)

The present invention relates to a process for regenerating silver salt solutions.

It is known that unsaturated compounds, e.g. olefins, dienes or aromatic hydrocarbons, can be separated from gases or liquids by absorbing such compounds with silver salt solutions. In view of the fact that the capacity of a solution for absorbing unsaturated substances depends on the pressure and temperature used and also depends substantially on the concentration in which the silver is used in such solution, it is evident that readily water-soluble silver salts, e.g. the fluoride or more especially the perchlorate, fluoborate and fluosilicate, must be employed.

In continuous processes using apparatus made of metallic material which is less noble than silver, the silver salt solutions become contaminated with metal compounds, e.g. iron, chromium, nickel, manganese or copper compounds.

The present invention is based on the observation that solutions of readily water-soluble silver salts, e.g. silver fluoride, silver fluosilicate, silver fluoborate, silver trifluoroacetate or silver perchlorate, can be regenerated, i.e. freed from metal compounds contaminating the silver salt solution, by extracting those aqueous solutions or the dried residues thereof which are obtained by distillation, with an organic solvent substantially inert towards those silver salts under the conditions used, for example aromatic hydrocarbons, olefins, ethers, organic acid esters, ketones, alcohols, phenols or halogenated hydrocarbons, whereby the silver salt is dissolved in the organic solvent. The metal compounds which contaminate the silver salt solution are not absorbed by the organic solvent and remain in the aqueous phase. The silver salt can subsequently be isolated from the organic solvent by washing or by evaporating the organic solvent and used in such isolated form. The silver salt solutions to be extracted may be admixed with a small proportion of an oxidizing agent, e.g. hydrogen peroxide, to avoid reductive influences.

When the starting material is an aqueous silver salt solution, the silver salt is extracted with a solvent not completely miscible with water, e.g. an aliphatic ether, an aromatic hydrocarbon or an ester, the metallic impurities being retained in the aqueous phase. The extracted silver salt is then removed from the solvent by washing.

In view of the greater water-solubility of the silver salts commercially used for absorbing unsaturated compounds, direct extraction with organic solvents is, however, time-consuming and requires rather large amounts of solvent to be used. Sometimes, it is therefore more favorable first to partially or completely dehydrate and thus concentrate the aqueous silver salt solution and then to extract the concentrate or anhydrous residue with the organic solvent. Still further, the aqueous silver salt solution or a concentrate thereof may be admixed and thus extracted with a solvent not entirely miscible with water which either forms an azeotropic mixture with water and/or boils at a higher temperature than water, the solvent being used in a proportion sufficient to dissolve the silver salt. The water is then expelled, if desired, in the form of an azeotropic mixture with the solvent, the water is removed from the condensate of the azeotrope and the organic solvent is used again. This procedure enables low temperatures to be used which is rather advantageous since the stability of silver salt solutions decreases as the temperature increases. The solution of the silver salt in the organic solvent so obtained is separated from the solid deposit containing the less noble metal compounds which are insoluble in the solvent, extracted with water until the silver salt is in the aqueous phase, or treated in the manner described above.

The silver salt may also be transferred from water into an organic solvent by using a solvent which is entirely miscible with water. In this case, direct extraction of the aqueous silver salt solution is, of course, no longer possible. It is, however possible to extract a dehydrated residue or, if the solvent used has a higher boiling temperature than water and does not form an azeotropic mixture with water, to dehydrate an aqueous silver salt solution with simultaneous extraction of the silver salt. In either case, solutions of the silver salt in the organic solvent are obtained which are freed from the organic solvent by evaporation and again transformed into aqueous solutions by dissolving the residue in water.

The extraction may also be carried out continuously with the use of a solvent not entirely miscible with water. For this purpose, a partial current of a silver salt solution to be regenerated and cycled in an absorption-desorption unit used for isolating unsaturated compounds from substance mixtures is branched off, contacted in a first column with the extracting agent by conducting said partial current counter-currently to the extracting agent, the extracting agent charged with silver salt is washed out with fresh water in a second column, the extracting agent so freed from silver salt is returned into the first column, and the regenerated aqueous silver salt solution obtained in the second column is returned to the main cycle in the absorption-desorption unit.

In continuous manner there may also be carried out the extraction combined with dehydration using a solvent which is not entirely miscible with water, forms no azeotropic mixture with water and/or boils at a higher temperature than water. In this case, a partial current of the silver salt solution cycled in an apparatus for isolating unsaturated compounds from substance mixtures is branched off, contacted in a first column with the solvent at the boiling temperature of the water or, respectively, the azeotropic water/solvent mixture by conducting said partial current co-currently or counter-currently to the solvent, water is eliminated from condensate which may have been removed, the condensed solvent is returned to the column, the solution of the silver salt in the organic solvent flowing off said first column is washed with water in a second column, and the solvent washed out is again introduced into the first column. The impurities separated in the first column which are insoluble in the organic phase are removed. Columns which are connected in parallel and alternately operated and cleansed may be used, if desired. The aqueous silver salt solution is freed from impurities is returned to the cycle in the main apparatus.

The present process for regenerating partial currents of silver salt solutions cycled in apparatus used for the isolation of unsaturated compounds from substance mixtures may be further simplified when used on an industrial scale and the re-extraction with water may under circumstances be omitted. To this end, the solution of the silver salt in the organic solvent is directly conducted, if desired with addition of water, to the desorption stage of the apparatus from which the aqueous silver salt solution to be regenerated was withdrawn. In this case, the unsaturated material obtained in the principal apparatus also contain the extracting agent used in the extraction stage at least in that case where the extracting agent used is more readily volatile than water. This simplified process is used especially in those cases where the desorbed substance is identical with the extracting agent used, e.g. for benzene extraction with silver salt solution which is used for separating benzene from cyclohexane, or where the extracting agent can be readily separated from the desorbed substance or where some minor proportion of extracting agent may remain in the desorbed substance.

The process of this invention or individual stages thereof can be carried out under reduced or superatmospheric pressure. The extraction is carried out under superatmospheric pressure, for example, in that case where an extracting agent known to be suitable for use in the process has an undesired high vapor pressure under atmospheric conditions. Inversely, reduced pressure is applied when, for example, in the dehydration with combined extraction the boiling point of water or, respectively, the azeotropic mixture of water/extracting agent is so high at atmospheric pressure that the silver salt and/or the extracting agent undergo undesired chemical reactions. Sometimes, it may be advantageous to re-extract the silver salt from the organic phase with water under reduced or superatmospheric pressure or under a pressure different from that used in the extracting stage. This may be done, for example, when it is intended to favor or suppress simultaneous evaporation of the extracting agent and/or water.

The present process or individual stages thereof can be carried out within wide limits of temperature. In that variant of the instant process where dehydration is combined with extraction or carried out separately, the temperature is determined by the boiling temperature of the water or the azeotropic mixture of water/solvent which in turn can be increased or reduced by pressure variation. The lower temperature limit is determined by the solidification point of the aqueous silver salt solution, which may be less than $-30°$ C. with highly concentrated solutions, or by the solidification point of the extracting agent or that of the eutectic mixtures comprising silver salt, water and solvent which may appear.

The upper temperature limit is a function of the stability of the silver salt and the solvent. More especially, temperatures between $-20$ and $+200°$ C., preferably 0 and $150°$ C., will be used.

Depending on the specific process variant used solvents are employed which are miscible or immiscible with water, form or do not form azeotropic mixtures with water, boil or melt at a higher temperature than water and have a greater or smaller density than water. As suitable solvents there may be mentioned more especially:

Aromatic hydrocarbons, e.g. benzene, toluene, xylene, ethylbenzene, trimethylbenzenes and their aromatic isomers, such as methylethylbenzene or cumenes, cymenes, naphthalene, methylnaphthalene;
Aliphatic, aromatic, symmetrical or unsymmetrical and cyclic ethers, e.g. diethylether, dimethylether, amylether, methylethylether, anisole, phenetol, dioxane, tetrahydrofurane;
Monovalent or polyvalent, aliphatic or aromatic, symmetrical or unsymmetrical ketones, e.g. acetone, methylethylketone, acetonylacetone, acetophenone, benzophenone;
Monohydric or polyhydric alcohols, e.g. methanol, ethanol, propanol, butanols, amyl alcohols, glycol, butane diols; phenols, e.g. phenol, cresols, xylenols;
Esters of organic acids, e.g. methyl, ethyl, propyl, butyl and amyl acetate, propionate, butyrate or benzoate;
Halogenated hydrocarbons, such as chlorobenzene, bromobenzene, dichlorobenzene, chlorotoluene, chloroform, ethyl chloride, trichloroethylene;
Nitrated hydrocarbons, e.g. nitroethane, nitrobenzene, nitrotoluene;
Olefinically unsaturated hydrocarbons, e.g. octene, decene, 1,5-octadiene, heptene, hexene.

Aromatic and olefinic hydrocarbons, ethers, high ketones and alcohols are especially suitable for use in the present process. Other solvents, e.g. halogenated hydrocarbons, are less suitable since—primarily the aliphatic hydrocarbons—they may involve precipitation of silver halides, especially at relatively high temperatures. Esters may be inappropriate when the solution to be regenerated is acid and therefore has a hydrolyzing effect on such ester. Nitrated hydrocarbons may not be used when the material to be isolated from a substance mixture in the main apparatus must be free from nitrogen compounds. Still further, water-miscible solvents, such as low alcohols and ketones, cannot be used in those variants of the process where the re-extraction is carried out with water. The above solvents may be used alone or in admixture with one another.

The following examples serve to illustrate the invention, but they are not intended to limit it thereto:

*Example 1*

100 cc. p-xylene and 50 cc. of an aqueous solution (density: 1.90) containing 32 g. silver (silverfluoborate), 0.5 g. iron, 0.5 g. chromium and 0.1 g. nickel were introduced into a flask provided with reflux condenser and water separator. A total of 32 g. water was expelled by evaporating the azeotropic mixture water/p-xylene at about $90°$ C. and atmospheric pressure and by reconducting the condensed p-xylene into the flask. In the flask remained a solution of silver borfluoride in p-xylene which still contained some water, and solid substances including iron, chromium and nickel. The solid constituents were removed from the solution by filtration or decantation and the solution was washed three times, each time with 32 g. water. The resulting aqueous extracts contained, respectively, 30.5 and 1.2 and 0.05 g. silver and they were free from iron, chromium and nickel. The solid substance filtered off contained 0.5 g. iron, 0.5 g. chromium, 0.1 g. nickel and 0.3 g. silver. The silver lost may be replaced by adding some silver fluoborate to the aqueous extract.

*Example 2*

In a device used for extracting a specifically heavier liquid with the use of a specifically lighter liquid 50 cc. of a silver fluoborate solution composed as described in Example 1 were extracted at $35°$ C. with 200 cc. diethylether by cycling the solution, the impurifying metal compounds being retained in the lower aqueous layer of the extractor. The resulting extract was washed three times, each time with 32 g. water. The resulting aqueous solutions contained, respectively, 30.7 and 0.5 and 0.01 g. silver and they were free from iron, chromium and nickel. The lower layer in the extracting device contained 0.7 g. silver.

We claim:
1. A process for regenerating an aqueous solution of silver salt selected from the group consisting of silver fluoride, silver fluosilicate, silver fluoborate and silver trifluoracetate contaminated with other dissolved metal salts which comprises extracting silver salt from said solution by absorption in an organic solvent selected from the group consisting of benzene, naphthalene, lower alkyl substituted benzenes, lower alkyl substituted naphthalenes and lower alkoxy lower alkanes, said solvent being substantially chemically unreactive with said silver salt and incapable of absorbing any substantial amount of said other metal salt, removing said absorbed silver salt from said organic solvent, and redissolving said removed silver salt in water.

2. The process defined in claim 1, wherein the silver salt is sliver fluoborate.

3. The process of claim 1, wherein the aqueous silver salt solution is evaporated prior to the extraction.

4. The process of claim 1, wherein the silver salt is removed from the organic solvent by evaporating said solvent.

5. The process of claim 1, wherein the silver salt is removed from the organic solvent by washing the solvent containing the silver salt with water.

6. The process of claim 1, wherein the silver salt is silver fluosilicate.

7. The process of claim 1, wherein the solvent is xylene.

8. The process of claim 1, wherein the solvent is diethyl ether.

9. The process defined in claim 1 wherein the solvent is an aromatic hydrocarbon having up to eleven carbon atoms.

References Cited by the Examiner

UNITED STATES PATENTS

| | | | |
|---|---|---|---|
| 2,075,179 | 3/37 | Cunningham | 23—312 |
| 2,859,091 | 11/58 | Winters | 23—312 |
| 2,913,505 | 11/59 | Van Raay et al. | |

FOREIGN PATENTS 204,079   3/56   Australia.

OTHER REFERENCES

Amer. Chem. Soc. Jour., 1925, vol. 47, pages 2702–2712.

NORMAN YUDKOFF, *Primary Examiner.*

JAMES H. TAYMAN, *Examiner.*